(12) United States Patent
Park (10) Patent No.: US 11,338,871 B2
(45) Date of Patent: May 24, 2022

(54) MAGNETIC TRACK FOR TRAVELING ON WALL AND CEILING OF STEEL STRUCTURE

(71) Applicant: ZETA CREZEN CO., LTD., Gunpo (KR)

(72) Inventor: Won Ha Park, Gunpo (KR)

(73) Assignee: Zete Crezen Co., Ltd., Gunpo (KR)

( * ) Notice: Subject to any disclaimer, the term of this patent is extended or adjusted under 35 U.S.C. 154(b) by 385 days.

(21) Appl. No.: 16/463,806

(22) PCT Filed: Nov. 15, 2017

(86) PCT No.: PCT/KR2017/012954
§ 371 (c)(1),
(2) Date: May 23, 2019

(87) PCT Pub. No.: WO2018/097535
PCT Pub. Date: May 31, 2018

(65) Prior Publication Data
US 2019/0283820 A1    Sep. 19, 2019

(30) Foreign Application Priority Data
Nov. 24, 2016 (KR) ........................ 10-2016-0157706

(51) Int. Cl.
*B62D 55/265* (2006.01)
*B62D 55/084* (2006.01)

(52) U.S. Cl.
CPC ....... *B62D 55/265* (2013.01); *B62D 55/0847* (2013.01)

(58) Field of Classification Search
CPC ... B62D 55/265; B62D 55/0847; B62D 55/22
See application file for complete search history.

(56) References Cited

U.S. PATENT DOCUMENTS 3,777,834 A * 12/1973 Hiraoka ............... B62D 55/265
180/9.44
3,960,229 A * 6/1976 Shio ..................... B62D 55/265
180/9.62
(Continued)

FOREIGN PATENT DOCUMENTS

CN    104590410 A      5/2015
CN    109436115 A  *  3/2019  ........... B62D 55/265
(Continued)

OTHER PUBLICATIONS

International Search Report for PCT/KR2017/012954, dated Feb. 14, 2018.

*Primary Examiner* — Jason R Bellinger
(74) *Attorney, Agent, or Firm* — Leydig, Voit & Mayer, Ltd.

(57) ABSTRACT

A magnetic track for traveling on a wall and a ceiling of a steel structure according to an exemplary embodiment of the present invention includes: a front wheel which is connected to a main body and positioned at one end; a rear wheel which is connected to the main body and positioned at the other end to face the front wheel; and a chain which is connected, in the form of a loop, to the front wheel and the rear wheel, in which multiple support devices are provided between the front wheel and the rear wheel to support the chain.

10 Claims, 4 Drawing Sheets

(56) References Cited

U.S. PATENT DOCUMENTS

| | | | | |
|---|---|---|---|---|
| 5,894,901 A * | 4/1999 | Awamura | ............ | B62D 55/265 |
| | | | | 180/9.54 |
| 9,096,283 B2 * | 8/2015 | Albin | ................... | B62D 55/265 |
| 2010/0231034 A1 | 9/2010 | Kanzler | | |
| 2021/0155300 A1 * | 5/2021 | Kadota | ................ | B62D 57/024 |

FOREIGN PATENT DOCUMENTS

| | | | | |
|---|---|---|---|---|
| CN | 109606491 A * | 4/2019 | .......... | B62D 55/265 |
| KR | H082455 A | 1/1996 | | |
| KR | 2003104251 A | 4/2003 | | |
| KR | 101548602 B1 | 9/2015 | | |

\* cited by examiner

MAGNETIC TRACK FOR TRAVELING ON WALL AND CEILING OF STEEL STRUCTURE

Cross-Reference to Related Applications

The present specification is a U.S. National Stage of International Patent Application No. PCT/KR2017/012954 filed Nov. 15, 2017, which claims priority to and the benefit of Korean Patent Application No. 10-2016-0157706 filed in the Korean Intellectual Property Office on Nov. 24, 2016, the entire contents of which are incorporated herein by reference.

Statement Regarding Government Sponsored Research

This invention was made with support of Interior and Safety of Republic of Korea under MPSS-haegyeong-2016-03 relating to Maritime Security Safety Research Development and External Seal Piercing Device Development, awarded by Natural Disaster Safety Technology Development Institute for the research period of May 1, 2016 to Dec. 31, 2019.

TECHNICAL FIELD

The present invention relates to a magnetic track for traveling on a wall and a ceiling of a steel structure, which may move in a state in which the magnetic track is attached to a wall and a ceiling of a steel structure such as a hull of a ship.

BACKGROUND ART

In general, a caterpillar track is a device including steel plates which are connected in the form of a chain, and front and rear wheels to which the steel plates are connected like a belt, and the caterpillar track travels as the front and rear wheels are rotated by power. The caterpillar track is also called an endless track. In comparison with common wheels, the caterpillar track has a large ground contact area and high friction with the ground surface, and thus the caterpillar track may freely travel even on a highly uneven road or a muddy road. In addition, a vehicle with left and right caterpillar tracks may freely change its direction by changing rotational speeds of the left and right caterpillar tracks, and may minimize a radius of rotation thereof. That is, the vehicle may turn around, while a center of the vehicle is not shifted, by rotating the two caterpillar tracks at an equal speed in opposite directions. The caterpillar track may be applied to an unmanned transporting device such as a robot. Recently, development is being conducted on an unmanned transporting device capable of performing various types of work while moving by using a caterpillar track having a permanent magnet in a state in which the caterpillar track is attached to a wall of a steel structure such as a ship manufactured by using steel. However, the caterpillar track applied to the unmanned transporting device in the related art has a problem in that attachment force generated by magnetic force is not uniformly applied when the caterpillar track moves along a wall of a steel structure, and for this reason, the attachment force generated by the magnetic force is at a level lower than expected.

As an example, Korean Patent No. 1548602 discloses "Endless Track for Device for Cleaning Bottom of Ship".

DISCLOSURE

Technical Problem

To solve the above-mentioned problem, an object of an exemplary embodiment of the present invention is to provide a magnetic track for traveling on a wall and a ceiling of a steel structure, which may be securely attached to a wall of a steel structure and may stably move on walls and ceilings of the steel structure which are flat and curved.

Technical Solution

To achieve the above-mentioned object, a magnetic track for traveling on a wall and a ceiling of a steel structure according to an exemplary embodiment of the present invention includes: a front wheel which is connected to a main body and positioned at one end; a rear wheel which is connected to the main body and positioned at the other end to face the front wheel; and a chain which is connected, in the form of a loop, to the front wheel and the rear wheel, in which multiple support devices are provided between the front wheel and the rear wheel to support the chain, and the support device includes: a pair of upper and lower track guides installed to face each other; and a guide bar configured to connect the pair of upper and lower track guides.

In addition, the track guide may include: a guide groove which is provided in one surface of the track guide that faces the chain, such that the chain is rotatably accommodated in the guide groove; catching projections which are provided at both ends of one surface of the track guide that faces the chain; and a coupling portion which is connected to an upper end or a lower end of the guide bar by means of a shaft pin.

In addition, the support device may further include a track piece, the chain may be coupled to one surface of the track piece in a state in which the chain is accommodated in the guide groove, bent ends, which are provided at left and right sides of the track piece, may be caught by the catching projections of the track guide, such that the bent ends are movable along the catching projections when the magnetic track travels, and a magnet casing may be coupled at a center of the other surface of the track piece.

In addition, anti-slip members may be coupled to left and right edges of the other surface of the track piece with the magnet casing interposed therebetween, and one surface of each of the anti-slip members may be configured as an uneven surface and may come into contact with a wall of a steel structure when the magnetic track travels.

In addition, the multiple track pieces may be coupled to the track guide.

In addition, a magnet accommodating portion, which accommodates a magnet, may be provided on one surface of the magnet casing, and the magnet accommodating portion may be coupled toward the track piece to prevent the accommodated magnet from being exposed to the outside in order to prevent the magnet from being damaged or corroded due to contact.

In addition, the multiple guide bars may be coupled to the coupling portion of the track guide.

In addition, a guide holder may be provided to have both ends between the front wheel and the rear wheel and between the pair of upper and lower track guides, the guide holder may be connected to the main body, and the guide bar may be coupled to the guide holder.

In addition, the guide holder may have coupling holes to which the guide bars are correspondingly coupled, the guide bars, which are positioned at both ends and provided adjacent to the front wheel and the rear wheel among the guide bars coupled to the guide holder, may be fixed to the guide holder fixed to the main body, and the guide bars, which are positioned between the guide bars positioned at both ends, may be freely movable vertically in a state in which the guide bars are inserted into the coupling holes.

In addition, an elastic member may be provided between the track guide and the guide holder.

Advantageous Effects

The magnetic track for traveling on a wall and a ceiling of a steel structure according to the exemplary embodiment of the present invention may be securely attached to the wall of the steel structure and may stably move on the flat and curved walls of the steel structure.

[Description of Reference Numerals]

10: Front wheel
20: Rear wheel
30: Chain
40: Support device
41: Track guide
42: Guide bar
43: Track piece
44: Magnet casing
45: Anti-slip member
46: Guide holder
47: Elastic member
50: Main body
60: Fixing bolt
70: Shaft pin
80: Hole
90: Wall
411: Guide groove
412: Catching projection
413: Coupling portion
431: Bent end
441: Magnet accommodating portion
442: Magnet
451: Uneven surface
461: Coupling hole

BEST MODE

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. Further, the exemplary embodiments of the present invention will be described below, but the technical spirit of the present invention is not limited thereto and may of course be modified and variously carried out by those skilled in the art.

First, a magnetic track for traveling on a wall and a ceiling of a steel structure according to an exemplary embodiment of the present invention will be described.

Figure 1:
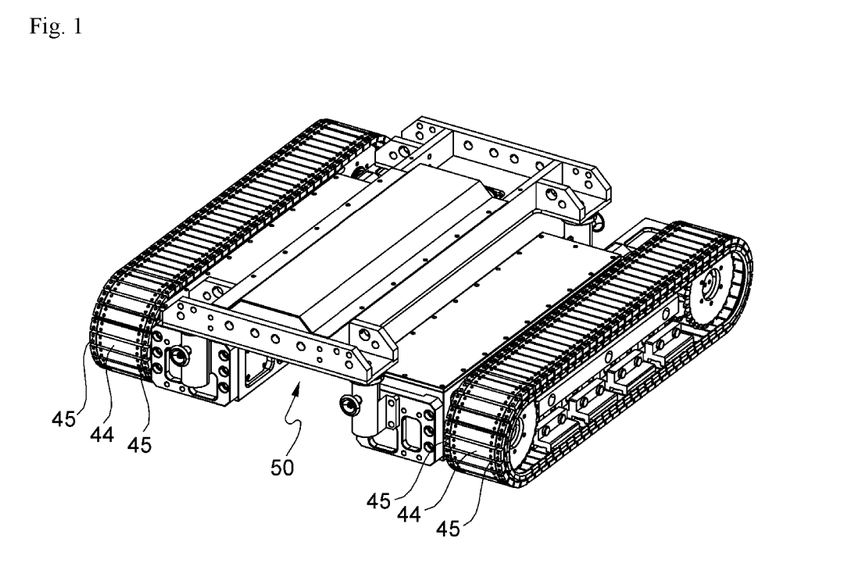
FIG. 1 is a perspective view of a magnetic track for traveling on a wall and a ceiling of a steel structure according to an exemplary embodiment of the present invention.
Figure 2:
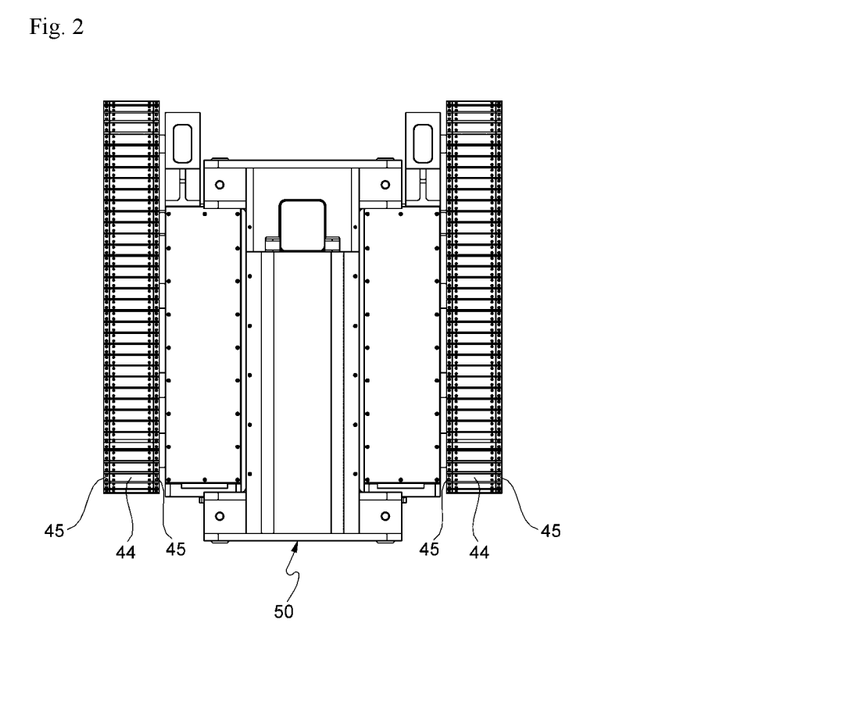
FIG. 2 is a top plan view of the magnetic track for traveling on a wall and a ceiling of a steel structure according to the exemplary embodiment of the present invention.
Figure 3:
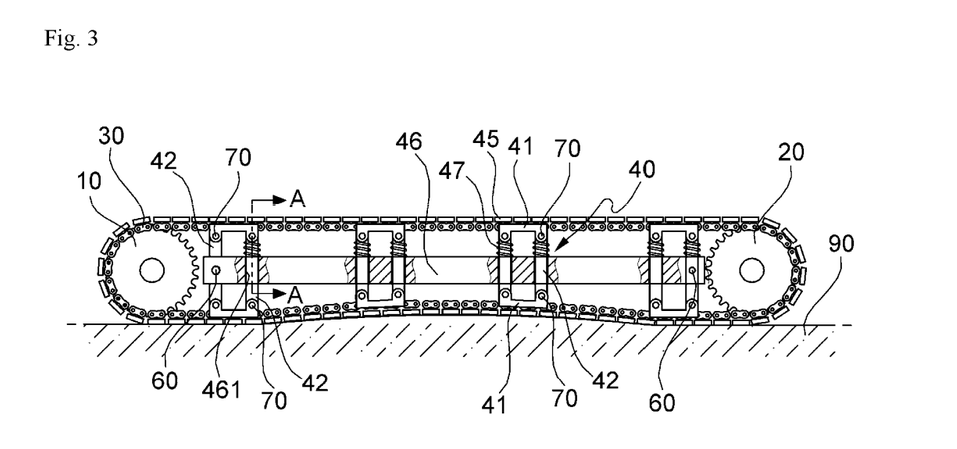
FIG. 3 is a side view of the magnetic track for traveling on a wall and a ceiling of a steel structure according to the exemplary embodiment of the present invention.

As illustrated in FIGS. 1 to 3, the magnetic track for traveling on a wall and a ceiling of a steel structure according to the exemplary embodiment of the present invention is mounted at each of the left and right sides of a main body of an unmanned transporting device and may be attached to and move on a wall of a steel structure such as a hull of a ship.

The magnetic track for traveling on a wall and a ceiling of a steel structure according to the exemplary embodiment of the present invention includes front and rear wheels 10 and 20 which are connected to one side of a main body 50, and chains 30 which are connected, in the form of a loop, to the front and rear wheels 10 and 20, and the magnetic track further includes multiple support devices 40 provided between the front wheel 10 and the rear wheel 20.

Specifically, the front wheel 10 is connected to the main body 50 of the unmanned transporting device. The front wheel 10 is positioned at one end. The rear wheel 20 is connected to the main body 50 so as to face the front wheel 10, and the rear wheel 20 is positioned at the other end. The front and rear wheels 10 and 20 are installed at a predetermined interval therebetween. When the front wheel 10 or the rear wheel 20 rotates by being supplied with power generated by a power generating device such as an engine, the chains 30 in the form of a loop rotate along a track line. This mechanism is identical to a mechanism of a caterpillar track in the related art.

As illustrated in FIG. 3, elastic members 47 are provided between track guides 41 and a guide holder 46. The elastic member 47 may be a spring. Specifically, the elastic member 47 is positioned close to one of the pair of upper and lower track guides 41 which is positioned at a position distant from a wall 90 of a steel structure when the magnetic track travels. The elastic members 47 may be coupled to one end of guide bars 42. The elastic members 47 are mounted between the track guides 41 and the guide holder 46, such that reaction force of the elastic members, which are compressed by attachment force of a magnet, is transmitted to the transporting device while the magnetic track travels. Magnet casings 44, which are positioned at a return side that is not in contact with the wall 90, may prevent sagging of the track.

As illustrated in FIG. 3, the two guide bars 42, which are positioned at left and right ends so as to be adjacent to the front wheel 10 and the rear wheel 20, respectively, are fixed to the guide holder 46. The remaining freely movable guide bars 42, which are positioned between the two guide bars 42 positioned at both ends, may be adjusted in length in accordance with a curvature of the convex wall 90. As an example, the remaining freely movable guide bars 42 may be designed to be gradually decreased in length toward a center between the front wheel 10 and the rear wheel 20 in accordance with a curvature of the convex wall 90. The freely movable guide bars 42 may be fitted into the guide holder 46 and may slide vertically. Even on the curved wall 90, track pieces 43 are adjusted in accordance with the curved wall 90 by the freely movable guide bars 42, such that the magnet casings 44 may come into close contact with the curved wall 90.

The chains 30, which are connected to the front wheel 10 and the rear wheel 20, and the magnet casings 44 are coupled to the track pieces 43. The chains 30 and the magnet casings 44 may be coupled to the track pieces 43 by means of coupling members such as bolts and nuts. The magnet casings 44 coupled to the track pieces 43 are connected in the form of a loop, thereby defining a track shape. The track of the magnet casings 44 connected in the form of a loop may be divided into a contact side which comes into contact with the wall 90 while the magnetic track travels, and the return side which is not in contact with the wall 90. Even on the curved wall 90, the track pieces 43 are adjusted in accordance with the curved shape of the wall 90 by the freely movable guide bars 42, such that the magnet casings 44 may come into close contact with the wall 90 which is a contact surface. An increase or decrease in length of the contact side and an increase or decrease in length of the return side, of the track having the magnet casings 44, are cancelled each other, such that tension of the track having the magnet casing 44 may be constantly maintained.

More specifically, the multiple support devices 40 are arranged between the front wheel 10 and the rear wheel 20. The support device 40 includes the track guides 41 and the guide bars 42. The pair of upper and lower track guides 41 are installed to face each other. The guide bars 42 connect the pair of upper and lower track guides 41.

Figure 4:
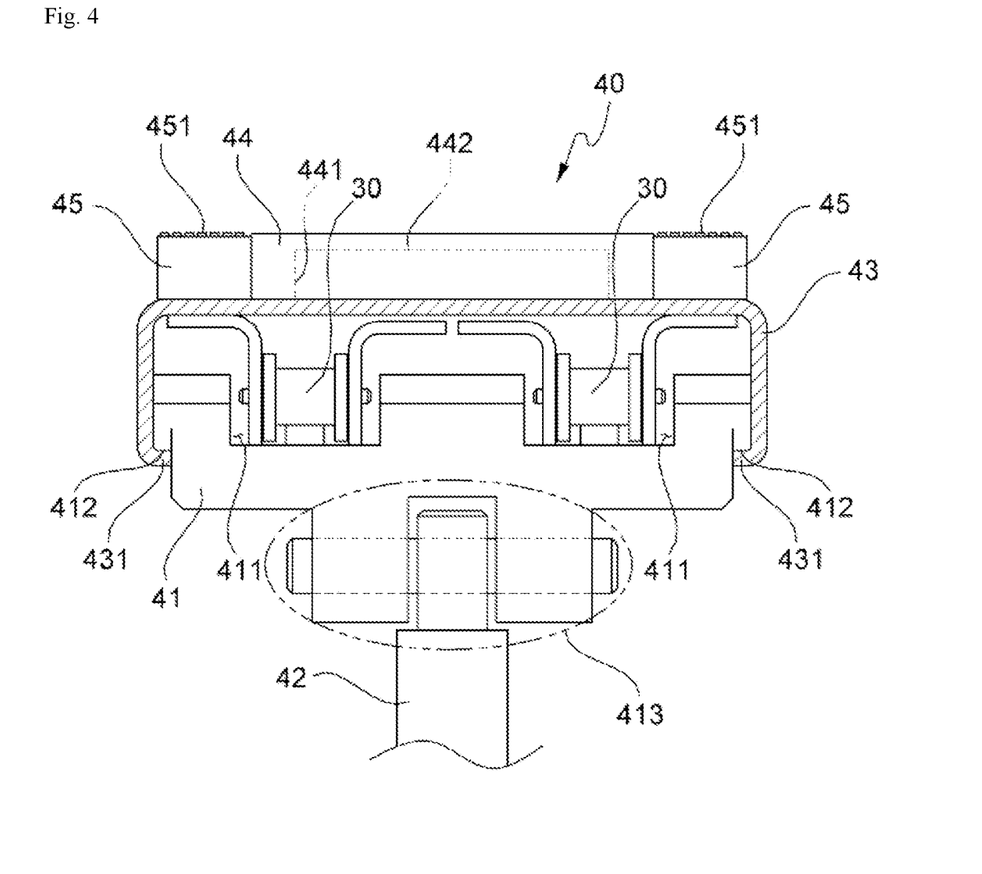
FIG. 4 is a cross-sectional view taken along line A-A in FIG. 3.
Figure 5:
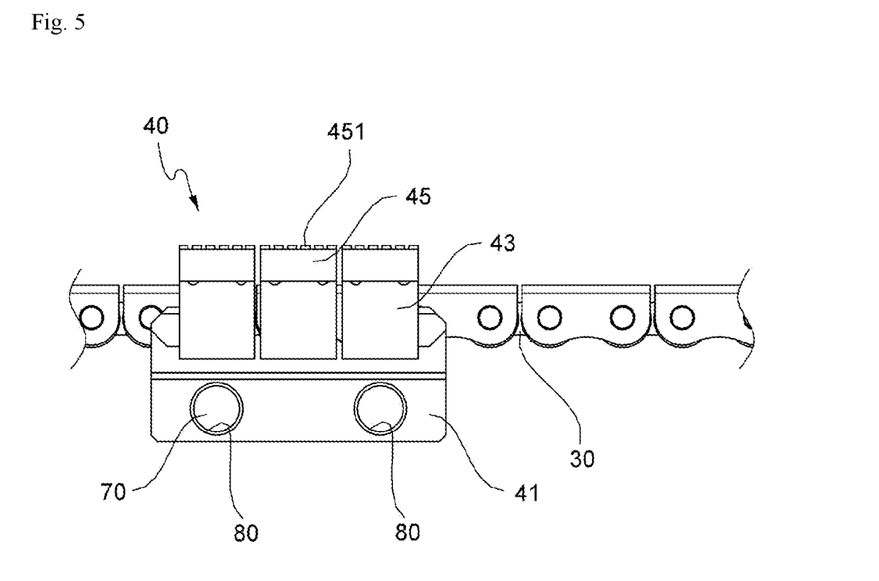
FIG. 5 is a side view illustrating a state in which various types of devices are coupled to a track guide according to the exemplary embodiment of the present invention.
Figure 6:
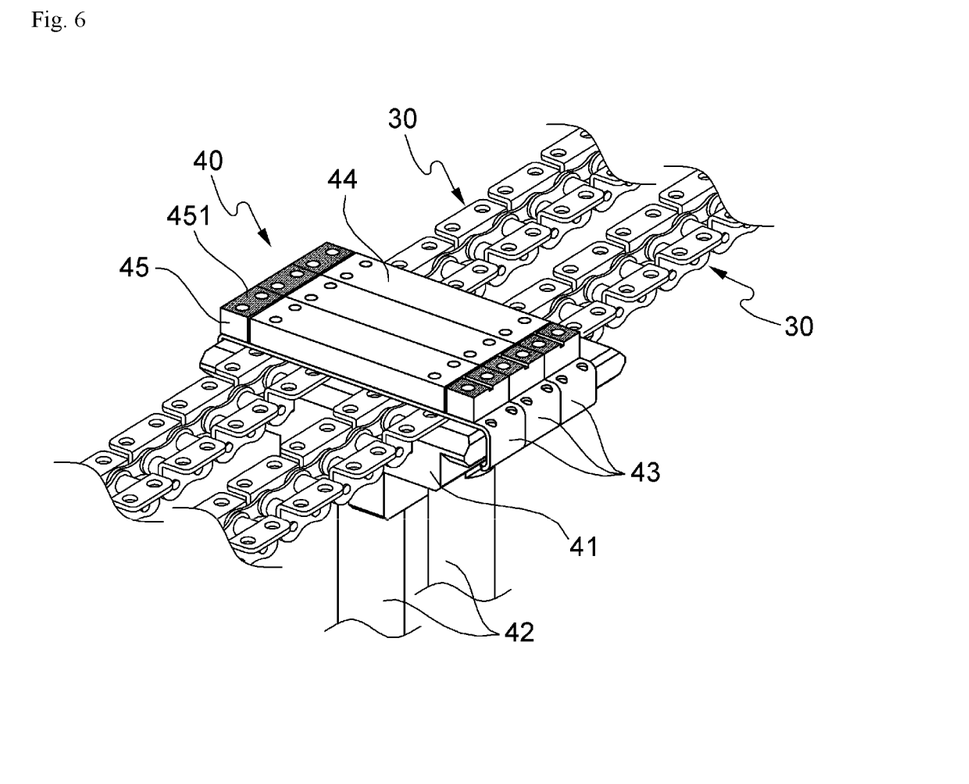
FIG. 6 is a perspective view illustrating a state in which various types of devices are coupled to the track guide according to the exemplary embodiment of the present invention.

As illustrated in FIGS. 4 to 6, the track guide 41 includes guide grooves 411 to which the chains 30 are correspondingly coupled, catching projections 412 by which bent ends 431 of the track pieces 43 are caught, and coupling portions 413 to which ends of the guide bars 42 are coupled.

The chains 30 are arranged in two rows on the track guide 41, and thus the guide grooves 411 of the track guide 41 are also formed in two rows correspondingly. The guide grooves 411 are provided at left and right sides of one surface of the track guide 41 which faces the chains 30. The guide grooves 411 are formed to conform to the chains 30. The chains 30 are accommodated in the guide grooves 411 so as to be rotatable along the track line.

The catching projections 412 are provided at both ends of one surface of the track guide 41 which faces the chains 30. The bent ends 431 of the track pieces 43 are caught by the catching projections 412 correspondingly. The coupling portions 413 are connected to one end or the other end of each of the guide bars 42. To this end, multiple holes 80, which are correspondingly coupled to shaft pins 70, are bored in lateral surfaces of the coupling portions 413 (see FIG. 5). The ends of the guide bars 42 and the coupling portions 413 are connected by means of the shaft pins 70.

The chains 30 are coupled to one surface of each of the track pieces 43 in a state in which the chains 30 are accommodated in the guide grooves 411 of the track guide 41. The multiple track pieces 43 are coupled to the track guide 41. FIGS. 4 to 6 illustrate that the three track pieces 43 are coupled to the track guide 41, but the present invention is not limited thereto. There is no limit to the number of track pieces 43 to be coupled to the track guide 41. For example, the three or three or more track pieces 43 may be coupled to the track guide 41.

The bent ends 431, which are provided at the left and right sides of the track pieces 43, are bent toward the catching projections 412 of the track guide 41. The bent ends 431 are correspondingly caught by the catching projections 412. The track pieces 43 rotate together with the chains 30 when the magnetic track travels. The bent ends 431 move along the catching projections 412 when the magnetic track travels in the state in which the bent ends 431 are caught by the catching projections 412. The magnet casing 44 is coupled at a center of the other surface of the track piece 43 in the state in which the bent ends 431 of the track piece 43 are caught by the catching projections 412. The other surface of the track piece 43 faces the wall 90 of the steel structure when the magnetic track travels.

A magnet accommodating portion 441 is provided on one surface of the magnet casing 44. A magnet 442 is accommodated in the magnet accommodating portion 441. The magnet 442 may be a permanent magnet. The magnet accommodating portion 441 provides a space that may accommodate the magnet 442. The magnet casing 44 is coupled such that one surface of the magnet casing 44 on which the magnet accommodating portion 441 is provided faces the track piece 43. The reason why the magnet casing 44 is coupled such that one surface of the magnet casing 44 on which the magnet accommodating portion 441 is provided faces the track piece 43 as described above is to prevent the magnet 442 coupled to the magnet accommodating portion 441 from being exposed to the outside. The magnet 442 may be broken or damaged due to impact or corroded if the magnet 442 is exposed to the outside. The above-mentioned configuration is provided to prevent damage to the magnet 442. The magnet casing 44 serves to fix and protect the magnet 442.

Anti-slip members 45 are coupled at left and right edges of the other surface of the track piece 43, and the magnet casing 44 coupled to the track piece 43 is interposed between the anti-slip members 45. One surface of the anti-slip member 45 is configured as an uneven surface 451. The uneven surface 451 may greatly increase contact force by minimizing a slip while coming into contact with the wall 90 of the steel structure when the magnetic track travels.

The two guide bars 42 may be coupled to the coupling portions 413 provided on the track guide 41. The guide holder 46 is provided between the front wheel 10 and the rear wheel 20. The guide holder 46 is positioned between the upper and lower track guides 41. The guide holder 46 serves to support the guide bars 42. The guide holder 46 is connected and installed so as to be fixed to the main body 50 of the unmanned transporting device by fixing members such as fixing bolt 60. The guide bars 42 are coupled to the guide holder 46, and the upper and lower ends of the guide bars 42 are connected to the coupling portions 413, provided on the pair of upper and lower track guides 41, by means of the shaft pins 70.

The guide holder 46 has coupling holes 461 to which the guide bars 42 are correspondingly coupled. The remaining freely movable guide bars 42 except for the guide bars 42 fixed to the guide holder 46 may vertically move corresponding to the curved wall 90 while the magnetic track travels, in the state in which the remaining freely movable guide bars 42 are coupled to the coupling holes 461.

Next, a process in which the magnetic track for traveling on a wall and a ceiling of a steel structure according to the exemplary embodiment of the present invention travels on the curved wall of the steel structure will be described.

As illustrated in FIG. 3, when the magnetic track for traveling on a wall and a ceiling of a steel structure according to the exemplary embodiment of the present invention is placed on the curved wall 90 of the steel structure, the magnetic track is attached to the wall 90 by magnetic force of the magnet 442 accommodated in the magnet casing 44. When power is transmitted to the front wheel 10 or the rear wheel 20 in this state, the front wheel 10 or the rear wheel 20 rotates, and the chains 30, which are connected, in the form of a loop, to the front wheel 10 and the rear wheel 20, rotate along the track line.

In this case, the chains 30 are coupled to the track pieces 43, and the bent ends 431 of the track pieces 43 are caught by the catching projections 412 of the track guide 41, and as a result, the track pieces 43 also rotate as the chains 30 rotate. The magnet casing 44 and the anti-slip members 45 come into contact with the wall 90 of the steel structure when the magnetic track travels. The magnet casing 44 and the anti-slip members 45 may move in the state in which the magnet casing 44 and the anti-slip members 45 are attached to the wall 90 of the steel structure by magnetic force of the magnet 442 accommodated in the magnet casing 44.

Since one track guide 41 supports the multiple track pieces 43 when the magnetic track travels, it is possible to maximize attachment force to the wall 90 of the steel structure. For example, the three track pieces 43 are coupled to one track guide 41, the three magnet casings 44 are coupled to the three track pieces 43, and magnetic forces of the three magnets 442 accommodated in the three magnet casings 44 are simultaneously applied to the wall 90 of the steel structure, such that it is possible to increase the attachment force to the wall 90 of the steel structure. The track with connected links has a connection structure that is movable in a direction perpendicular to the contact surface, and the track is supported by the track guides, such that it is possible to solve the technical problem to be solved by the present invention.

In addition, except for the guide bars 42 installed at the left and right ends, the remaining freely movable guide bars 42, which are positioned between the guide bars 42 installed at the left and right ends, may be moved vertically and individually when the magnetic track travels on the curved wall 90 of the steel structure, and as a result, it is possible to maximize close contact force of the magnet casing 44 to the curved wall 90 of the steel structure. That is, the track guides 41 are adjusted as the freely movable guide bars 42 move vertically in accordance with the curved wall 90 of the steel structure when the magnetic track travels on the curved wall 90 of the steel structure, and the magnet casings 44 conform to and come into contact with the curved wall 90 of the steel structure, such that it is possible to maximize attachment force to the wall 90 of the steel structure.

Figure 7:
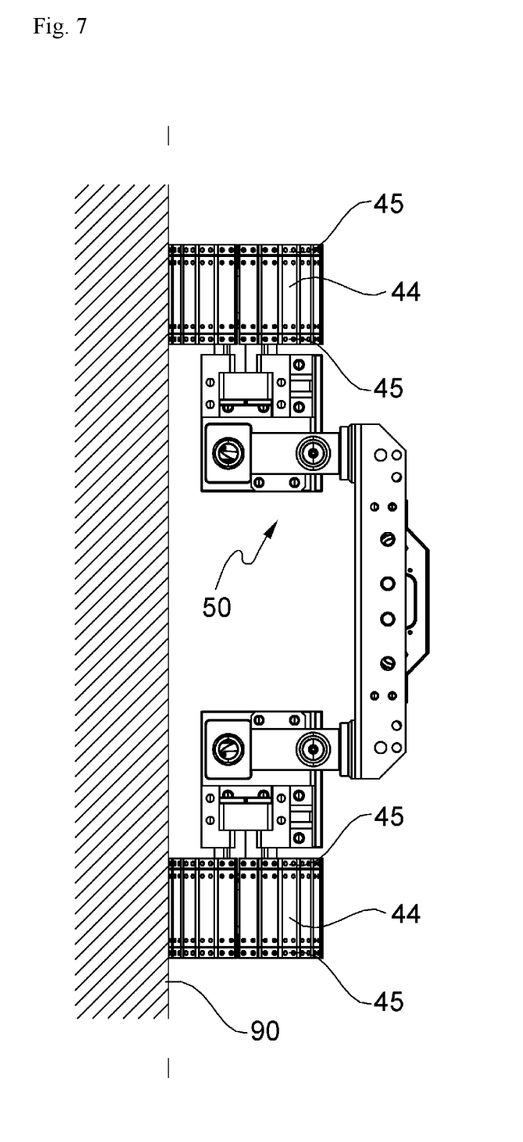
FIG. 7 is a view illustrating a state in which the magnetic track for traveling on a wall and a ceiling of a steel structure according to the exemplary embodiment of the present invention is attached to and moves on a lateral wall of a steel structure.

In addition, when the chains 30 operate, the track pieces 43 slide in the state in which the bent ends 431 are fitted with the catching projections 412 of the track guide 41. When the magnet casings 44 are attached to the wall 90 of the steel structure by magnetic force of the magnets 442 accommodated in the magnet casings 44, the force is transmitted directly to the track guide 41, thereby supporting the main body 50 of the unmanned transporting device. The contact force with the wall 90 of the steel structure may be increased by the anti-slip members 45 and the magnet casings 44 which are connected to one another in the form of a loop track like the chains 30. The magnetic force of the magnet 442 accommodated in the magnet casing 44 is strongly applied to the wall 90 of the steel structure. Therefore, the magnetic track for traveling on a wall of a steel structure according to the exemplary embodiment of the present invention may move in the state in which the magnetic track is securely attached to the wall 90 of the steel structure, without sagging caused by loads in the vertical direction and the lateral direction with respect to the contact surface (see FIG. 7).

As described above, in the magnetic track for traveling on a wall and a ceiling of a steel structure according to the present invention, the magnetic forces of all of the magnets accommodated in the magnet casings, which are connected to one another in the form of a loop to constitute the track, are applied to the wall of the steel structure, such that the magnetic track may support the overall loads and move in the state in which the magnetic track is attached to the wall of the steel structure.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

The invention claimed is:

1. A magnetic track for traveling on a wall and a ceiling of a steel structure, the magnetic track comprising:
    a front wheel which is connected to a main body and positioned at one end of the main body;
    a rear wheel which is connected to the main body and positioned at the other end of the main body to face the front wheel; and
    a chain which is connected, in the form of a loop, to the front wheel and the rear wheel,
    wherein multiple support devices are provided between the front wheel and the rear wheel to support the chain, and the support devices include: a pair of upper and lower track guides installed to face each other; and a guide bar configured to connect the pair of upper and lower track guides.

2. The magnetic track of claim 1, wherein each of the pair of upper and lower track guides includes:
    a guide groove which is provided in one surface that faces the chain, such that the chain is rotatably accommodated in the guide groove;
    catching projections which are provided at both ends of the one surface that faces the chain; and
    a coupling portion which is connected to an upper end or a lower end of the guide bar by a shaft pin.

3. The magnetic track of claim 2, wherein the support devices further include a track piece, the chain is coupled to one surface of the track piece in a state in which the chain is accommodated in the guide groove, bent ends, which are provided at left and right sides of the track piece, are caught by the catching projections of the track guide, such that the bent ends are movable along the catching projections when the magnetic track travels, and a magnet casing is coupled at a center of the track piece.

4. The magnetic track of claim 3, further comprising anti-slip members coupled to left and right edges of the track piece with the magnet casing interposed therebetween, and one surface of each of the anti-slip members is configured as an uneven surface and comes into contact with a wall of a steel structure when the magnetic track travels.

5. The magnetic track of claim 3, wherein the multiple track pieces are coupled to the track guide.

6. The magnetic track of claim 3, further comprising a magnet accommodating portion disposed on one surface of the magnet casing, and the magnet accommodating portion accommodates a magnet to prevent exposure of the magnet outside of the magnet accommodating portion.

7. The magnetic track of claim 2, wherein multiple guide bars are coupled to the coupling portion of the track guide.

8. The magnetic track of claim 2, wherein a guide holder is provided to have both ends between the front wheel and the rear wheel and between the pair of upper and lower track guides, the guide holder is connected to the main body, and the guide bar is coupled to the guide holder.

9. The magnetic track of claim 8, further comprising a plurality of guide bars, wherein each guide bar adjacent to the front wheel and the rear wheel are fixed to the guide holder, and guide bars positioned between the guide bars adjacent to the front wheel and the rear wheel are coupled to the guide holder to allow for vertical movement.

10. The magnetic track of claim 8, wherein an elastic member is provided between the track guide and the guide holder.

* * * * *

UNITED STATES PATENT AND TRADEMARK OFFICE
CERTIFICATE OF CORRECTION

| | |
|---|---|
| PATENT NO. | : 11,338,871 B2 |
| APPLICATION NO. | : 16/463806 |
| DATED | : May 24, 2022 |
| INVENTOR(S) | : Won Ha Park |

It is certified that error appears in the above-identified patent and that said Letters Patent is hereby corrected as shown below:

On the Title Page

Item (73), Assignee "Zete Crezen Co., Ltd." should read "ZETA CREZEN CO., LTD."

Signed and Sealed this
Seventeenth Day of September, 2024

Katherine Kelly Vidal
*Director of the United States Patent and Trademark Office*